(12) United States Patent
Pereira et al.

(10) Patent No.: US 7,796,598 B2
(45) Date of Patent: Sep. 14, 2010

(54) SYNCHRONIZING REDUNDANT VIDEO STREAMS ENCAPSULATED IN IP/UDP PACKETS

(75) Inventors: Michael A. Pereira, Milpitas, CA (US); John A. Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 478 days.

(21) Appl. No.: 11/278,524

(22) Filed: Apr. 3, 2006

(65) Prior Publication Data

US 2007/0237185 A1    Oct. 11, 2007

(51) Int. Cl.
*H04J 3/06*    (2006.01)
(52) U.S. Cl. .................. 370/392; 370/412; 370/503; 714/100
(58) Field of Classification Search ............... 370/535, 370/498, 464, 392, 412, 503–520; 714/6, 714/5, 4, 3, 2, 1, 100
See application file for complete search history.

(56) References Cited

U.S. PATENT DOCUMENTS

| | | | | |
|---|---|---|---|---|
| 6,360,234 | B2 * | 3/2002 | Jain et al. .................... | 715/201 |
| 6,556,540 | B1 * | 4/2003 | Mawhinney et al. ........ | 370/229 |
| 6,839,865 | B2 * | 1/2005 | Gould et al. .................. | 714/6 |
| 2005/0144314 | A1 * | 6/2005 | Kan et al. .................... | 709/238 |
| 2006/0187900 | A1 * | 8/2006 | Akbar .......................... | 370/352 |
| 2006/0233369 | A1 * | 10/2006 | Pinder et al. ................ | 380/216 |
| 2007/0133693 | A1 * | 6/2007 | Gan et al. .............. | 375/240.26 |
| 2007/0153679 | A1 * | 7/2007 | Jost et al. ..................... | 370/218 |
| 2008/0075168 | A1 * | 3/2008 | Toma et al. ............ | 375/240.15 |

OTHER PUBLICATIONS

"Engage Communication Tunes into MPEG Point to Multipoint IP Video Distribution," Engage Communication, Inc., Aptos, CA, Mar. 12, 2003. Downloaded Feb. 18, 2006 from http://www.engagecom.com/News/IPExpressXLB_MLB_PR.htm.
"IP Express DLT1," Engage Communication, Inc., Aptos, CA. Downloaded Feb. 18, 2006 from http://www.engagecom.com/.
"IP Express User's Guide: IP Express XL/ML/MLDI/QT1/QE1: WAN Router Families," Engage Communication, Inc., Aptos, CA. Downloaded Feb. 18, 2006 from http://www.engagecom.com/pdf/IPExpress_User_Guide.pdf.
"IPExpress MLBH E1: IP WAN Router with Integrated E1 DSU/CSUs," Engage Communication, Inc., Aptos, CA. Downloaded Feb. 18, 2006 from http://www.engagecom.com/.
"IP Express QT1," Engage Communication, Inc., Aptos, CA. Downloaded Feb. 18, 2006 from http://www.engagecom.com/.

(Continued)

*Primary Examiner*—Seema S Rao
*Assistant Examiner*—Mon Cheri S Davenport
(74) *Attorney, Agent, or Firm*—Dov Rosenfeld; Inventek

(57) ABSTRACT

An apparatus, e.g., in a network edge device, a method, and a software program product for synchronizing two or more redundant media streams, e.g., MPEG video streams. The method includes receiving network packets encapsulating redundant media streams representing the same media program, buffering the received streams, learning a program identifier for the media program, searching the packets of the redundant streams for synchronization points defined by a plurality of parameters of stream packets, synchronizing the redundant streams based on the comparison, and providing a single stream as an output stream.

46 Claims, 8 Drawing Sheets

OTHER PUBLICATIONS

Table of Contents for "ExpressRouter Online Manual," Engage Communication, Inc., Aptos, CA. Downloaded Feb. 18, 2006 from http://www.engagecom.com/general_html/expressrouter_manual.htm.

I. Mirkin and D. Vyzovitis, "VidTorrent," Presentation at the Feb. 25, 2005 CFP working group meeting, Viral Communications, MIT Media Lab, Cambridge, MA. Downloaded on Dec. 3, 2005 from http://viral.media.mit.edu/index.php?page=vidtorrent.

M. Adams and M. Chelehmal, "Quality Video over IP Networks: Achieving High-Quality IPTV Services with Payload-Aware Network Devices," Terayon Communication Systems, Inc., Santa Clara, CA. Downloaded Feb. 21, 2006 from www.terayon.com/.

Y. Liu and M. Claypool, "Using Redundancy to Repair Video Damaged by Network Data Loss," in *ACM/SPIE Multimedia Computing and Networking* (*MMCN*) San Jose, CA, Jan. 25-27, 2000. Downloaded on Dec. 3, 2005. Available online at http://web.cs.wpi.edu/~claypool/papers/video-redundancy/99-18.pdf.

\* cited by examiner

| Syntax | No. of bits | Mnemonic |
|---|---|---|
| transport_packet(){ | | |
|     sync_byt | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_scrambling_control | 2 | bslbf |
|     adaptation_field_control | 2 | bslbf |
|     continuity_counter | 4 | uimsbf |
|     if(adaptation_field_control=='10' | | |
|         \|\| adaptation_field_control=='11'){ | | |
|         adaptation_field() | | |
|     } | | |
|     if(adaptation_field_control=='01' | | |
|         \|\| adaptation_field_control=='11') { | | |
|         for (i=0;i<N;i++){ | | |
|             data_byte | 8 | bslbf |
|         } | | |
|     } | | |
| } | | |

FIG. 3 (Prior Art)

The bit stream syntax uses the "C"-code convention that a variable
or expression evaluating to a non-zero value is equivalent to a condition
that is TRUE.

| | |
|---|---|
| data_element | a data element of a specific type |
| while ( condition ) {<br>  data_element<br>  . . .<br>} | If the condition is true, then the group of data elements occurs next in the data stream. This repeats until the condition is not true. |
| if ( condition) {<br>  data_element<br>  . . .<br>} | If the condition is true, then the first group of data elements occurs next in the data stream. |
| for (i = 0;i<n;i++) {<br>  data_element<br>  . . .<br>} | The group of data elements occurs n times. Conditional constructs within the group of data elements may depend on the value of the loop control variable i, which is set to zero for the first occurrence, incremented to 1 for the second occurrence, and so forth. |
| bslbf | Bit string, left bit first, where "left" is the order in which bit strings are written in the Recommendation \| International Standard. Bit strings are written as a string of 1s and 0s within single quote marks, e.g. '1000 0001.' Blanks within a bit string are for ease of reading and have no significance. |
| uimsbf | Unsigned integer, most significant bit first |

The byte order of multi-byte words is most significant byte first.

FIG. 4 (Prior Art)

| Syntax | No. of Bits | Mnemonic |
|---|---|---|
| PES_packet() { | | |
|     packet_start_code_prefix | 24 | bslbf |
|     stream_id | 8 | uimsbf |
|     PES_packet_length | 16 | uimsbf |
|     if( stream_id != program_stream_map | | |
|     && stream_id != padding_stream | | |
|     && stream_id != private_stream_2 | | |
|     && stream_id != ECM | | |
|     && stream_id != EMM | | |
|     && stream_id != program_stream_directory | | |
|     && stream_id != DSMCC_stream | | |
|     && stream_id != ITU-T Rec. H.222.1 type E_stream) { | | |
|         '10' | 2 | bslbf |
|       PES_scrambling_control | 2 | bslbf |
|       PES_priority | 1 | bslbf |
|       data_alignment_indicator | 1 | bslbf |
|       copyright | 1 | bslbf |
|       original_or_copy | 1 | bslbf |
|       PTS_DTS_flags | 2 | bslbf |
|       ESCR_flag | 1 | bslbf |
|       ES_rate_flag | 1 | bslbf |
|       DSM_trick_mode_flag | 1 | bslbf |
|       additional_copy_info_flag | 1 | bslbf |
|       PES_CRC_flag | 1 | bslbf |
|       PES_extension_flag | 1 | bslbf |
|       PES_header_data_length | 8 | uimsbf |
|       if (PTS_DTS_flags =='10' ) { | | |
|       ⋮ | ⋮ | ⋮ |
|     else if ( stream_id == program_stream_map | | |
|     \|\| stream_id == private_stream_2 | | |
|     \|\| stream_id == ECM | | |
|     \|\| stream_id == EMM | | |
|     \|\| stream_id == program_stream_directory | | |
|     \|\| stream_id == DSMCC_stream) | | |
|     \|\| stream_id == ITU-T Rec. H.222.1 type E stream { | | |
|         for ( i=0;i<PES_pack et_length;i++) { | | |
|           PES_packet_data_byte | 8 | bslbf |
|         } | | |
|     } | | |
|     else if ( stream_id == padding_stream) { | | |
|         for ( i=0;i<PES_pack et_length;i++) { | | |
|           padding_byte | 8 | bslbf |
|         } | | |
|     } | | |
| } | | |

FIG. 5 (Prior Art)

SYNCHRONIZING REDUNDANT VIDEO STREAMS ENCAPSULATED IN IP/UDP PACKETS

BACKGROUND

The present invention is related to video, and in particular to a system and method to synchronize received video transport streams that were sent via separate paths as redundant video transport streams encapsulated in IP/UDP packets.

With the advent of fast IP-based networks, there has been a move in recent years to delivering broadcast video information over IP. Many current Video over IP deployments are based on delivering broadcast video over multicast via IP/UDP with the video in compressed form, e.g., MPEG-2, and packetized using standard Transport Stream (TS) format into TS packets. Often more than one video stream is sent in order to provide a level of redundancy to increase reliability. Thus, two or more streams are sent over a network, e.g., via different network paths to a network edge device. The redundant streams are received at the network edge device, and passed further down the distribution path, eventually to an end user's set-top box (STB).

FIG. 1 shows a simple network 100 that will be used herein to illustrate aspects of the invention. For purposes of illustration, a source, e.g., a broadcast feed sits at one end of a network, e.g., at a headend. In this example, the feed feeds two streams—a first stream 105 shown by black arrows, and a second stream 107 shown in outline arrows. These also are called the primary and secondary streams, respectively. The distribution network 103 accepts the streams at a distribution router 111 (Router 1), which is in this example the core router or switch that generally sits at the headend site and serves to deliver all the backend traffic to the main distribution network 103. It is assumed that the distribution router 111 has multicast routing capability. Several routers 111, 113, 115, and 117 are shown in FIG. 1. Router 113 (Router 2) is an intermediate router, and there may be several such routers. The delivery end(s) of the network is/are called aggregation point(s), and two such aggregation points are shown in FIG. 1, as a first aggregation router 115 (Router 3) and a second aggregation router 117 (Router 4). The links connecting the distribution router 111 to the aggregation routers 115, 117 are assumed to support the speed and number of channels for distributing the streams from the source 103.

The aggregation routers are edge devices that connect to the paths that deliver streams to individual subscribers. In the examples shown, the subscribers receive signals at set-top boxes (STBs) via DSL, and, for example, the aggregation router 115 connects to a DSL access multiplexer (DSLAM) device 121 that connects to a first set of STBs, including an STB 123, while the aggregation router 117 connects to a DSLAM 125 that connects to a second set of STBs, including an STB 127.

While DSL is assumed herein, other distribution methods, e.g., by cable via QAMs, fiber in xPON, or other delivery mechanisms may be used to deliver the stream(s) to the subscribers.

FIG. 1 is highly simplified, and many details are left out of the network 100, such as residential gateways, satellite links, various servers, the hierarchy of headends that often exists, and so forth, in order not to detract form the inventive aspects described herein.

The STB is the direct interface to each subscriber, as shown by television monitors coupled to each STB.

Thus, in order to increase reliability, two or more streams, e.g., first and second streams 105, 107 are sent via the distribution network 103. The two streams are received at a network edge device, e.g., device 119 that in one embodiment is part of the aggregation router 115, and a single stream 109 is produced from the redundant streams 105, 107 and streamed from the network edge device 119. For the redundancy to be useful in dealing with packet loss and other errors in the stream(s), there is a need to be able to accurately synchronize the two or more video streams at the network edge device 119. By synchronizing is meant the ability to know which received packet or packets correspond in the two or more redundant streams.

UDP is often used for media transport because UDP requires little overhead. UDP, however, does not have support for packet sequencing information. Thus, when delivering multiple redundant video streams over multicast via IP/UDP, there is a need in the art for a method and system to synchronize the received streams and detect stream failure conditions by inspecting the contents of the packets.

As can be seen in FIG. 1, the paths followed by streams 105 and 107 through the distribution network 103 can be different. Hence, each stream will undergo a different delay. Furthermore, there may be packets lost in one stream, but not at the other. Furthermore, the packets may arrive in different order than sent, as each packet may be sent via a different path.

Thus, there is a need in the art for a method and apparatus, e.g., one that can operate in a network edge device, and that can inspect the contents of the packets arriving via streams 105 and 107, and produce a single stream 109.

SUMMARY

Described herein are a method, an apparatus, and a computer readable medium to synchronize a plurality of received media streams representing the same media program.

One aspect is providing a method that includes receiving network packets, e.g., UDP packets in IP packets encapsulating a plurality of redundant media streams, e.g., MPEG-2 streams representing the same media program. Each stream is provided in stream packetized form as stream packets, e.g., TS packets, such that each network packet encapsulates a plurality of stream packets. The method includes buffering the received streams, e.g., to account for the different amounts of delays each network packet of each stream may encounter. The method further includes learning a program identifier, e.g., the TS Program Identifier (PID) for the media program from the buffered streams, and searching the packets of the buffered redundant streams for synchronization points for the learned program identifier. Each synchronization point is defined by a plurality of parameters of the stream packets sufficient to uniquely identify a location in the streams. For example, in one embodiment wherein each stream includes an MPEG stream packetized into PES packets containing TS packets, each synchronization point is defined as the combination of the PID, payload_unit_start_indicator, continuity_counter, packet_start_code_prefix, stream_id, and PES_packet_length. The method further includes comparing synchronization points, synchronizing the redundant streams based on the comparison, and providing a single stream as an output stream, the providing of each packet containing the output stream being from one of the received buffered streams.

In some embodiments the method further includes ascertaining whether at least one stream failure condition from a set of possible failure conditions has occurred, taking corrective action based on the what failure condition was ascertained to have occurred, and setting the timing of the output stream. In one embodiment, the set of possible failure conditions includes loss of one or more network packets, receiving one or more duplicate network packets, and a failover event, including loss of a stream.

Another aspect of the invention provides an apparatus, e.g., an apparatus that is in a network edge device. The apparatus includes a set of input buffers coupled to network interfaces, and configured to receive network packets encapsulating a plurality of redundant media streams representing the same media program. As in the method described above, each stream is provided in stream packetized form as stream packets, such that each network packet encapsulates a plurality of stream packets.

The apparatus includes redundancy logic coupled to the input buffers and configured, in operation, to learn a program identifier for the media program, to search the packets of the redundant streams for synchronization points for the learned program identifier, each synchronization point defined by a plurality of parameters of the stream packets sufficient to uniquely identify a location in the streams, to compare synchronization points, to synchronize the redundant streams based on the comparison; and to provide a single stream as an output stream, the providing of each packet containing the output stream being from one of the received buffered streams.

Another aspect of the invention provides an apparatus, e.g., an apparatus that is in a network edge device. The apparatus includes means for receiving network packets encapsulating a plurality of redundant media streams representing the same media program, each stream provided in stream packetized form as stream packets, such that each network packet encapsulates a plurality of stream packets. The apparatus also includes means for buffering the received streams, e.g., to account for different arrival times for the redundant streams, means for learning a program identifier for the media program, means for searching, the packets of the redundant streams for synchronization points for the learned program identifier, each synchronization point defined by a plurality of parameters of the stream packets sufficient to uniquely identify a location in the streams, means for comparing synchronization points and synchronizing the redundant streams based on the comparison; and means for providing a single stream as an output stream, wherein each packet containing the output stream is from one of the received buffered streams.

Another aspect of the invention provides a computer-readable medium carrying a set of instructions that when executed by at least one processor of a processing system, causes the processing system to carry out the method described in this SUMMARY section.

Other aspects, features, and advantages will be clear from the description and claims provided herein.

BRIEF DESCRIPTION OF THE DRAWINGS

FIG. 3 provides a description of the bit stream data in a TS packet, and shows how TS packets are formed.

FIG. 4 describes aspects of a bit stream syntax used in FIG. 3 for the description of bit stream data.

FIG. 5 shows some of the information in a PES packet, including some PES header information, and follows the bit stream syntax of FIG. 4.

DETAILED DESCRIPTION

Described herein are: a method at an edge device and a system for synchronizing multiple redundant broadcast video streams delivered over IP/UDP as encapsulated transport stream (TS) packets, i.e., IP/UDP/TS from the same source, e.g., the same encoder/multiplexer/server, but traversing possibly different network paths. The method is based on identifying deterministic synchronization characteristics of the video stream(s). Another aspect of the invention describes how subsequent failures in one or more of the redundant streams can be mitigated either via switch-over from one stream to another redundant stream, or by packet(s) replacement.

While the description herein is for video streams received as TS packets encapsulated in UDP packets of video streams representing the same video program, the invention is in general applicable to network packets encapsulating a plurality of redundant media streams representing the same media program, each stream provided in stream packetized form as stream packets, such that each network packet encapsulates a plurality of stream packets. In the example described herein, the stream packets are TS packets, and the network packets are UDP packets, and the media program is an MPEG-2 video program.

Figure 1:
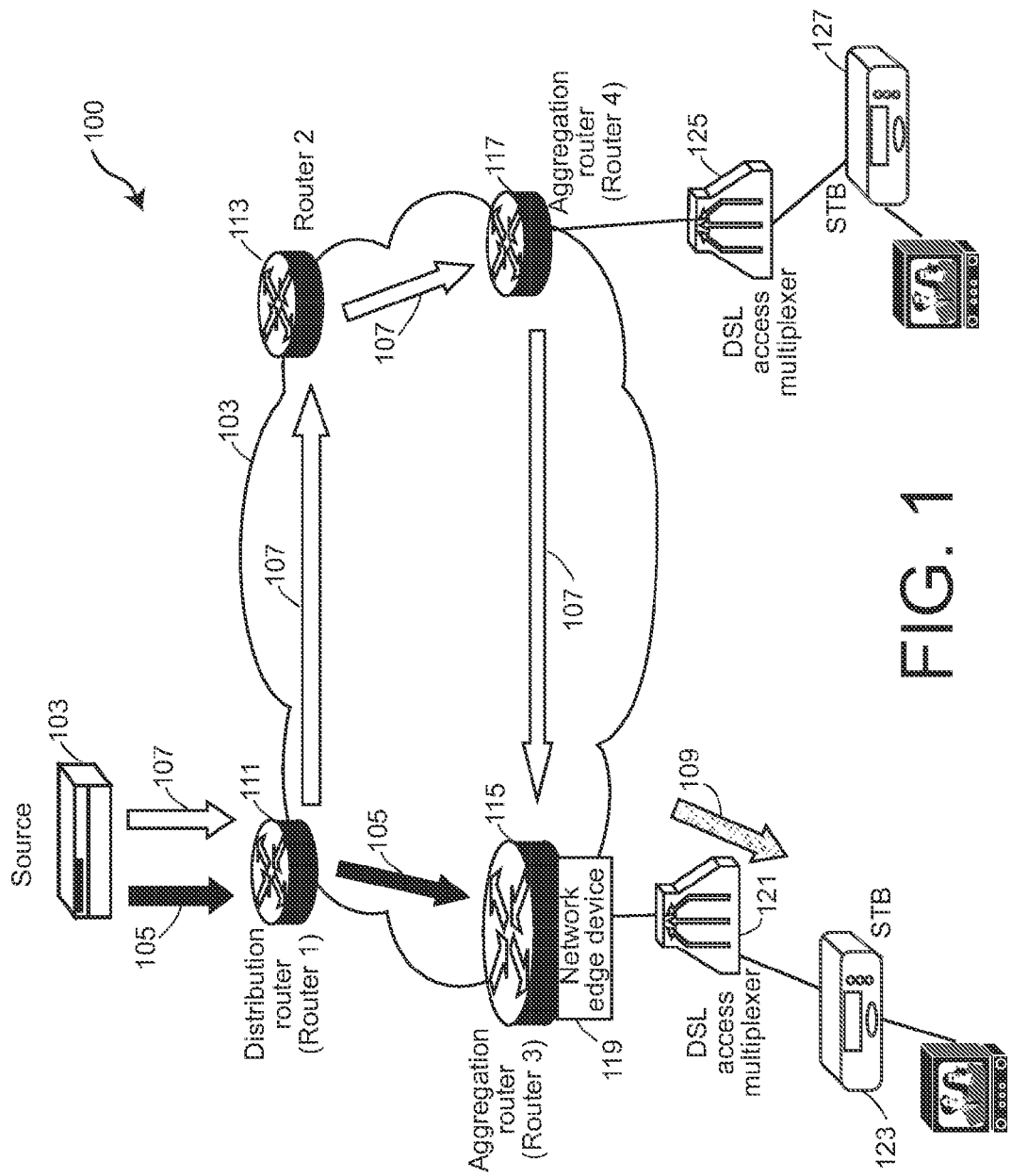
FIG. 1 shows an exemplary video distribution network including a network edge device which includes an embodiment of the present invention.

Referring to FIG. 1, an exemplary network 100 including a distribution network 103 that includes a distribution device, e.g., distribution router 111 and edge devices, e.g., edge device 119 in the aggregation router 115. In the example described herein, two streams 105 and 107 are assumed, and in general, more than two redundant streams may be sent. The first and second streams are associated as belonging to the same media program. In one embodiment, this is done statically, e.g., via statically via a command line interface (CLI) such as the CLI of Cisco's IOS network operating system or similar, or dynamically via the Session Description Protocol (SDP).

Denote by $T_1$ the delay for stream 107, and $T_2$ the delay for stream 109. Denote by $T_d$ the worse case (largest) difference between $T_1$ and $T_2$.

The streams are assumed to be MPEG-2 streams, and the invention is applicable to compressed media streams compressed according to other standards. The MPEG-2 streams are assumed to be in standard transport stream (TS) packet form.

Figure 2:
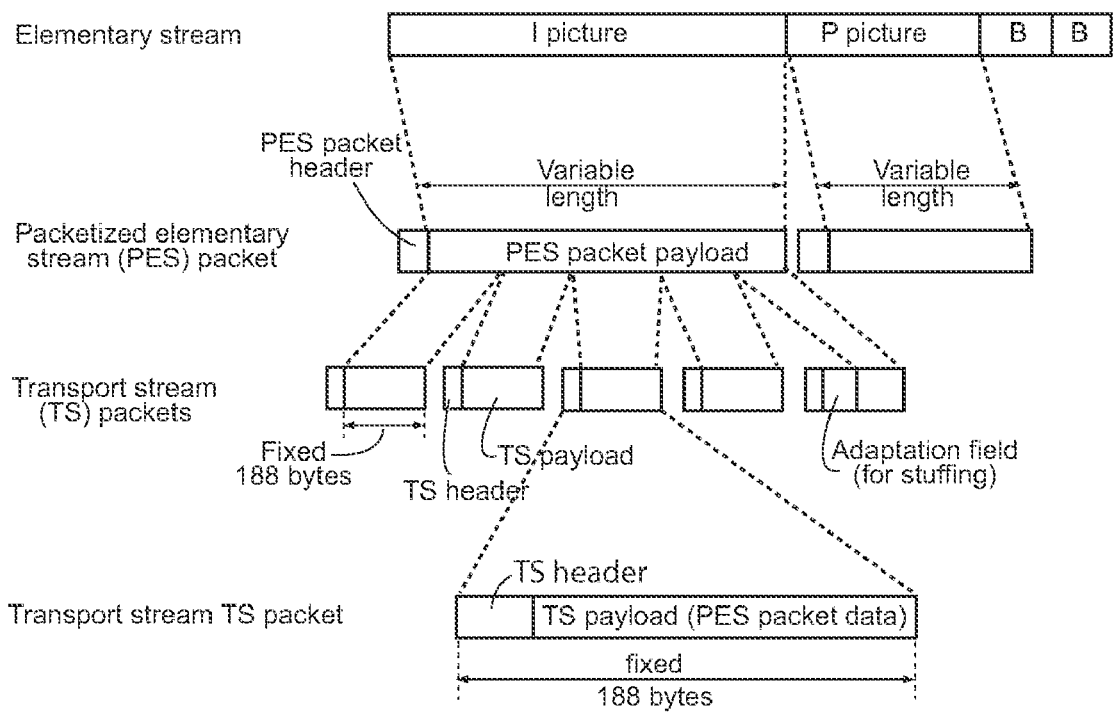
FIG. 2 shows how an MPEG elementary stream of I, P and B pictures is packetized into variable length Elementary Stream (PES) packets and then to Transport Stream (TS) packets.

A video stream includes different types of compressed pictures, e.g., compressed video frames. The stream is packetized into compressed picture packets, which in one example is a PES packet. FIG. 2 shows how an MPEG elementary stream of I, P and B pictures is packetized into variable length packets representing each picture, these packets called Packetized Elementary Stream (PES) packets each representing a picture, and then to Transport Stream (TS) packets. Each PES packet has a PES header and a payload representing a picture, which is further packetized into a number of fixed length 188-byte TS packets, each having a TS header and a payload of the PES data. PES packets align themselves with TS boundaries in which the last TS packet of a PES packet's PES payload can contain stuffing bytes to provide PES alignment with TS, because TS packets are each of fixed length.

Note that while FIG. 2 shows each picture is contained in a single picture packet—a PES packet in this example—there is no requirement to align the start of each picture to the start of a picture packet's payload. Thus, in general, a new image frame/picture may start at any point in the payload of a picture packet, e.g., of a PES-packet, and it is possible for several small pictures/frames to be contained in a single picture-packet, e.g., PES-packet.

The packetization of the stream into PES and TS packets, and the packets are defined by ITU-T Recommendation H.222.0 and ISO/IEC Standard 13818-1 titled "Generic Coding Of Moving Pictures and Associated Audio: Systems."

In the examples described herein, the TS packets are encapsulated in UDP packets. Each UDP packet encapsulates 7 TS packets. Thus, there is a total UDP payload of 1316 bytes.

FIG. 3 shows using a syntax, details of how TS packets are formed. The syntax of the description of bit stream data in FIG. 3 is described in FIG. 4 based on the published H.222.0 (ISO/IEC 13818-1) standard. The bit stream syntax uses the "C"-code convention that a variable or expression evaluating to a non-zero value is equivalent to a condition that is TRUE. The term "bslbf" means Bit string, left bit first, while the term "uimsbf" means unsigned integer, most significant bit first.

FIG. 5 shows some of the information in a PES packet, and follows the bit stream syntax of FIG. 4.

Some of the data elements of a TS packet (see FIG. 3) that are used in one embodiment of the invention for the purpose of synchronization include:

| | |
|---|---|
| PID: | A 13-bit video Program ID for the TS packet, also called Program Identifier. |
| payload_unit_start_indicator | A 1-bit identifier used to indicate when set the start of a PES packet |
| continuity_counter | A 4-bit counter for the particular program identified by the particular PID. |

Some of the data elements of a PES packet header (see FIG. 5) that are used in one embodiment of the invention for the purpose of synchronization include:

| | |
|---|---|
| packet_start_code_prefix | A unique 24 bit code (0x000001) that indicates the start of a PES packet |
| stream_id | An 8-bit identifier for the PES stream |
| PES_packet_length | Number of bytes in the PES packet |

The necessary and sufficient information to demultiplex and present programs corresponding to the data carried in the TS packets is carried as what is called Program Specific Information (PSI), in the form of PSI tables that are carried in the transport stream. One use of the PSI is to give meaning to the PID. The PID identifies, via the PSI tables, the contents of the data contained in the Transport Stream packet. TS packets of one PID value carry data of one and only one elementary stream.

Figure 6:
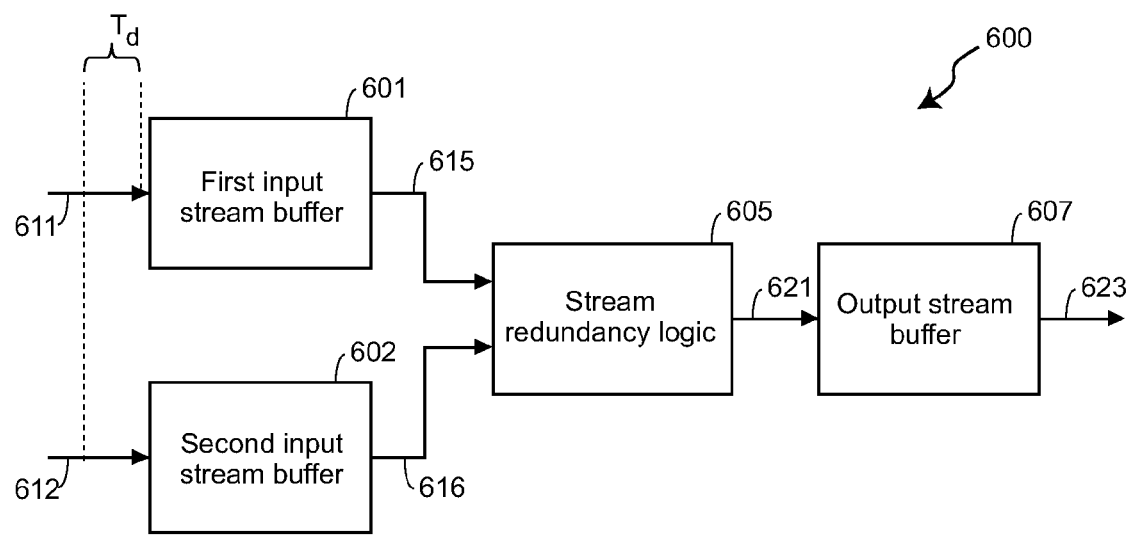
FIG. 6 shows a simplified block diagram of a system implemented in a network edge device that includes redundancy logic to synchronize a plurality of redundant video streams according to an embodiment of the present invention.

FIG. 6 shows one embodiment of a system 600 that is implemented in a network edge device, e.g., device 119 and includes a first input stream buffer 601 and a second input stream buffer 602 for buffering a first received stream 611 and a second received stream 612, respectively. These streams are, for example the received versions of the streams 105 and 107, respectively, of FIG. 1. The buffers are designed to provide for the worse case relative latency between the streams, such maximum latency denoted by $T_d$ herein. The outputs 615, 616 of the buffers are accepted by redundancy logic 605 that merges/synchronizes the streams to generate a single output stream 621 according to aspects of the present invention. The output stream 621 is buffered in an output stream buffer 607 to produce a buffered output stream 623.

The operation of redundancy logic 605 carries out synchronization of the two streams and generates the output stream. Redundancy logic 605 switches-over one of the streams, say a synchronized version of the first stream 105 to one or more redundant stream(s), e.g., a synchronized version of the second stream 107 based on packet loss or loss of stream. In some embodiments, redundancy logic 605 also corrects for packet loss, duplicates packets, and orders out-of-order packets prior to the stream 621 being delivered to the output buffer 607.

Because no sequence numbering is provided in IP/UDP, Redundancy logic 605 examines the transport stream packets in the UDP packet in order to synchronize the streams that may be delayed up to Td relative to each other. As shown in FIG. 3, a TS header includes a four-bit continuity counter (continuity_counter, or CC) for each specific program identified by a video program ID (PID). Given that there can be up to 7 TS packets in the same IP/UDP packet belonging to the same PID, just the 4-bits continuity_counter alone does not allow for accurate stream synchronization and stream fault characterization. The combination of the continuity_counter and PID is used only as a first level check.

Figure 7:
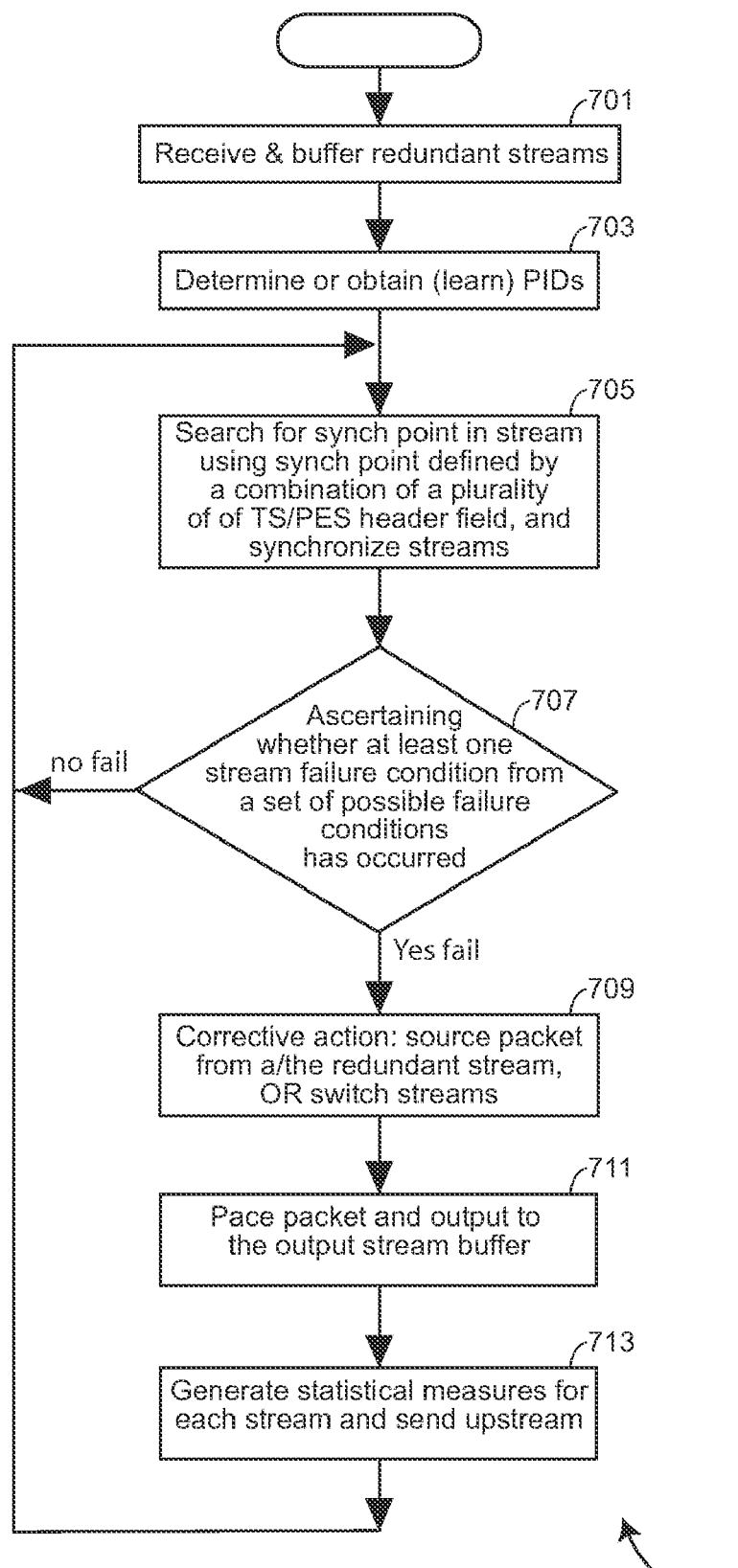
FIG. 7 shows a simplified flowchart of one embodiment of synchronizing the video streams according to aspects of the present invention.

FIG. 7 shows a simplified flowchart of one embodiment of a method 700 of synchronizing the video streams. The method 700 is typically carried out by the system 600 including the buffers 601, 602 and redundancy logic 605 in a network edge device. In 701, the redundant streams are received in the network edge device encapsulated as TS packets in UDP packets. Also in 701, the received packets are buffered to account for the different arrival times of the redundant streams. The redundant streams are assumed to include a program that has a video Program ID also called the PID.

In 703, redundancy logic 605 extracts or otherwise learns the Program Specific Information (PSI) from the buffered streams in order to determine the video Program ID (PID). A first alternative for step 703 of learning the PID is to configure the stream PID, e.g., via a command line interface (CLI) such as the CLI of Cisco's IOS network operating system or similar, used in many network devices. In an alternate embodiment, the PID is passed to the network edge device via another, e.g., out-of-band communication channel so that learning the PID of step 703 includes receiving the PID.

In 705, the redundancy logic 605 searches for points in the stream we call synchronization points. Synchronization points are each a start of a PES header. The unique location of a unique synchronization point is defined by a combination of TS and PES header fields sufficient to uniquely determine points in the stream of a program. Thus, 705 includes the redundancy logic 605 examining the TS packet(s) for a PES packet to examine a quantity determined from a plurality of TS fields and PES header fields sufficient to uniquely determine synchronization points. As the synchronization points are at each PES start points, each such location can be identified by a 32-bit code that combines the 24-bit packet_start_code_prefix and the 8-bit stream_id. The unique synchronization points themselves are identified by a combination of TS packet fields and PES header fields that uniquely identify locations in the IP/UDP/TS packet stream. One version uses for the synchronization points the combination of the PID, payload_unit_start_indicator, continuity_counter, packet_start_code_prefix, stream_id, and PES_packet_length. The inventors have found that this combination uniquely identifies a location in an IP/UDP/TS stream, and further and provides for synchronization between multiple redundant streams that contain that same unique location. Alternate embodiments use other combination of TS packet fields and PES header fields that are sufficient for identifying the location.

Once a synchronization point is detected in a stream, it is compared to synchronization point(s) in the redundant stream. Upon detection of an equivalent synchronization point in the redundant stream, step 705 synchronizes the streams by maintaining a correspondence of synchronization points, so that a synchronization state is achieved.

Supposing there are two streams and a maximum time difference of $T_d$ between them. Referring to FIG. 6, two possible buffer conditions for the primary/redundant streams are:

1) The first stream 611 lags the second stream 612. For this the first input stream buffer 601 has to be able to buffer at most $T_d$ worth of data. The amount of data that corresponds to of course depends on the data rates, the video resolutions, and so forth.
2) The first stream 611 leads the second stream 612. For this too the second input stream buffer 602 has to be able to buffer at most $T_d$ worth of data.

Continuing with the flowchart of the method 700, 707 includes ascertaining whether at least one stream failure condition from a set of possible failure conditions has occurred. In one embodiment, the set of possible failure conditions include loss of one or more UDP packets, receiving one or more duplicate UDP packets, and loss of a stream or other event we call a "failover event." How to detect each of these conditions is as follows.

Loss of One or More UDP Packets, or One or More Duplicates of UDP Packets Received To check for either of these failure conditions includes a first level check by examining the first TS packet for each received UDP packet of a primary stream, e.g., the first stream 615 from the first input stream buffer 601, and comparing the PID and continuity_counter against the equivalent PID and continuity_counter of the redundant stream(s), e.g., the second stream 616 from the second input stream buffer 602. In one embodiment, if PID and continuity_counter is the same for both streams, the assumption is made that they the streams are (still) in synchronization. In addition, the continuity_counter for all TS packets are checked for continuity both in the UDP packet and across UDP packets, to detect the case where the same UDP packet is dropped in both streams, or the case that there are duplicate packets.

In addition, a second level check is made to verify that the next unique synchronization point is received as expected in each stream by counting down the number of TS packets received compared with what was expected. That is, the expected TS packet count to the next synchronization point is compared to the actual received TS packet count prior to the next synchronization point. This is done by using the PES_packet_length of the PES header. In one embodiment, the number of TS packets per PES packer, denoted $N_{TS}$ is approximated by $$N_{TS} \approx PES\_packet\_length/184.$$

This approximation does not take into account that there may be TS packets with adaptation fields. Such TS packets make the above formula an approximation.

In one alternate embodiment, the length to the next synchronization point is counted down as the actual PES packet payload for each TS packet is received.

In another alternate embodiment, verifying that the next unique synchronization point is received as expected in each stream includes comparing the expected PES packet length to the actual received PES_packet_length.

Loss of a Stream ("Failover" Event)

It is assumed that the redundant streams are paced from the same source, where by pacing is meant the mechanism that includes setting the timestamps of the media streams. One method of ascertaining if there has been any loss of stream or other event we call a "failover event" is based on a lack of packets being received on one stream for a pre-defined number, denoted packet_window, of packets being received on a redundant stream. In one embodiment, the number of packets, packet_window, is set to cover the worst case network jitter. In particular, in one embodiment, packet_window is set to the number of packets in 50 ms worth of video. The number of packets in an amount of time is readily calculated by the video resolution, the video rate, and so forth, as would be clear to those in the art.

In general, a failover event is an event that, if detected, causes the source of the output stream to be switched from one input stream to another. The system designer defines such failover conditions. A set of metrics is monitored to detect the failover event. different embodiments monitor one or more of:

As described above, a lack of packets being received on one stream for a pre-defined time, or equivalently for a pre-defined number of packets.

A pre-defined number of discontinuities of the continuity_counter of a stream.

A pre-defined number of complete PES packet(s) not being received.

A pre-defined amount of jitter measured according to one or another of jitter measurement methods, e.g., a pre-defined value of a metric such as the Media Delivery Index (MDI) that takes into account network delay and jitter. See the draft proposal to IETF in the document "draft-welch-mdi-03.txt" available (March 2006) at http://www.ietf.org/internet-drafts/draft-welch-mdi-03.txt.

If there is no failure, the method continues with the searching for synchronization points to synchronize the streams.

If a failure has been detected, the method, in 709 takes corrective action. Based on the type of failure and when the failure was detected, in one embodiment, one or two corrective mechanisms is followed in 709. Alternate embodiments provide for only one corrective action. The two actions are called synchronous stream correction and synchronous failover.

With synchronous stream correction, in the case it is ascertained that there has been a packet loss, or there is a duplicate packet, the missing packet can be sourced from the redundant stream.

With synchronous failover, in the case that there has been detected a loss of stream, or other failover event, the input to the output buffer is switched synchronously from the first video stream to the second, redundant video stream. Based on the fact that both streams are synchronized at the UDP packet level, a synchronous failover can be accomplished with minimal effort.

Note that the detailed description herein describes video streams. Media streams further include audio streams. In one embodiment, each media stream includes a compressed audio stream packetized into compressed audio packets. The synchronization points for the compressed audio stream are defined by a plurality of parameters of the compressed audio packets. In addition to 709 checking for video failure conditions, one embodiment also includes checking for audio stream failures and other failure conditions. For example, a simple continuity check may be made to check for the loss of audio among in the compressed audio packets.

The packet by packet correction in large part depends on the number of TS packets between synchronization points, which, in one embodiment, are at every PES start, the delay between streams, and the resulting stream(s) input and output buffering requirements.

In 711, once corrective action has been taken, the timing is set for a single output stream that is to be placed in the output stream buffer. Setting the timing is called "pacing" the stream. Two pacing methods are used in one embodiment.

According to a first pacing method, the output packets are paced by the sourcing stream of the output. That is, if the sourcing stream is the first stream, then for every UDP packet received into the first input stream buffer 601, a UDP packet is output. This first pacing method is relatively computationally simple, and also has relatively modest memory requirements. In one embodiment, when the streams are constant bit rate streams, the first pacing method is used.

According to a second pacing method, incoming packets are timestamped upon arrival by a timestamp of sufficient accuracy to indicate the relative times, i.e., marked with a timestamp upon arrival. This timestamp will follow the packets through 703-709 of method 700, so that upon reaching the pacing of 711, consecutive packets are output with the same relative delay as received consecutive packets. In one embodiment, the second pacing method is used when the streams are variable bit rate streams.

Any corrected packets generated in 709 are paced out an equal interval between the previous and the subsequent packet to the corrected packet.

One aspect of the invention is the maintaining of data sufficient to generate statistics of one or more types of errors. This is useful for determining the quality of the links involved. In 713, in one embodiment, statistical measures are generated from the data maintained during the processing. The statistical measures are sent out. One embodiment includes maintaining information and generating statistics on lost packets, duplicate packets, relative delay, and so forth. The statistics in one embodiment are reported to network nodes upstream from the network edge device for network level error monitoring and fault detection/isolation.

One embodiment separately tracks the statistics for each of the redundant multiple streams.

In one application, IP media streaming uses the Internet Group Management Protocol (IGMP). IGMP is a communications protocol used to manage the membership of Internet Protocol multicast groups, and is used by IP hosts and adjacent multicast routers to establish multicast group memberships. It is an integral part of the IP multicast specification, and is described in various IETF RFCs. In summary, the method includes, in one example in which IGMP is used:

1) Configuring the first and second streams as primary and redundant multicast groups pairs.
2) Receiving a IGMP "Join" request received.
3) Stream redundancy logic 605 issuing a "join" request to the primary and secondary multicast groups. The Stream redundancy logic 605 learns the PIDs of the programs. This corresponds to 703 of FIG. 7.
4) The primary and redundant streams may be delayed from each other by some maximum delay (Td). The streams start being received via buffers 601 and 602. SRL identifies Video PID and continues searching for packet_start_code_prefix followed by the stream_id for both streams. This corresponds to part of 705 of FIG. 7.
6) Synchronizing both streams by aligning synchronization point(s), e.g., {PID, continuity_counter, packet_start_code_prefix, stream_id, PES_packet_length} between streams. This corresponds to part of 705 of FIG. 7.
7) Stream redundancy logic 605 determines any failure conditions (see 707). The transfer of packets from input stream to output stream (711), including the pacing, starts once the two streams are synchronized. Note that the output stream could be sourced by either the first or the secondary stream. Initially, e.g., the first stream is selected but based upon detected errors and switchover characteristics desired, the secondary stream can start sourcing the stream.
8) Once streaming starts from input to the output stream buffer, the pacing for outputting packets to the user can be done synchronous to receiving packets, i.e., in lock step. No clock or timing is required for pacing in the case of a constant bit rate stream.

The worst case delay introduced by the stream redundancy logic 605 is typically in the order tens of milliseconds, depend on the speed of the logic and/or processing elements used to implement 605.

Figure 8:
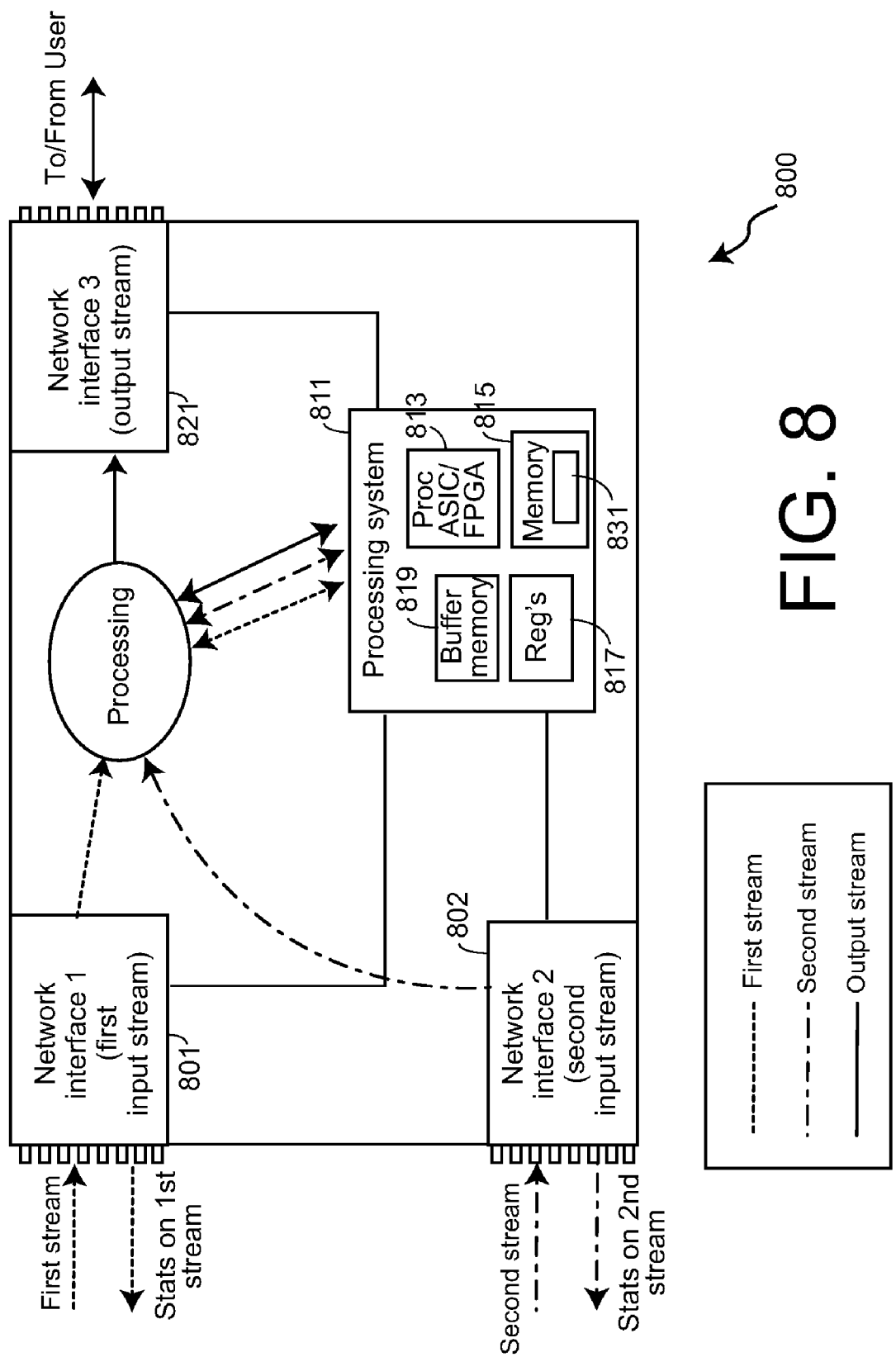
FIG. 8 shows a block diagram of an edge aggregation device embodiment that includes an implementation of the present invention.

FIG. 8 shows a block diagram of an edge aggregation device 800 that includes an implementation of the present invention. The device 800 includes a first network interface 801 that is shown accepting the first stream, a second network interface 802 that is shown accepting a second stream, and an output network interface 821 out of which is shown the output stream, and which accepts information from the user. In one embodiment the device 800 includes a processing system 811 that includes a processor 813, e.g., in the form of one or more ASICs of FPGAs, a memory 815, and registers 817. Not shown are many details of the processing system 811. Those in the art will understand for example, the system shown in FIG. 8 will include busses, and other connections.

The processing system 811 implements the redundancy logic 605. In one embodiment, the processor is wired to implement the logic described herein, and in another, the processor is a programmable processor that accepts machine-readable instructions 831 from memory 815. The instructions when executed by the processor 813 implement the method described above, e.g., the function of the stream redundancy logic 605. Other functions common to an edge aggregation device also are included.

The network interfaces 801, 802, and 821 are coupled to the processing system 811 as shown by the solid un-arrowed lines.

Buffer memory 819 is shown separate in FIG. 8, and those in the art will understand that in alternate embodiments, the buffer memory may be part of memory 815. Similarly the registers 817 may be part of the processor 813.

FIG. 8 also shows directional lines that indicate the data flow for stream data and for data about the streams for each of the first, the second, and the output stream.

Thus a method and apparatus for synchronizing redundant input media streams, and for generating a single output stream have been described.

Note that while the invention has been described in terms of media streams that are encapsulated in UDP packets, the invention is applicable also to other forms of delivering packetized media streams, e.g., using RTP in IP, and RTP over UDP in IP.

It should be appreciated that although the invention has been described in the context of UDP packets containing standard transport stream MPEG-2 packets, the invention is not limited to such contexts and may be utilized in various other applications and systems, for example in a system that uses other MEPG standards such as MPEG-1, MPEG-4 Part 2 and AVC (MPEG-4 Part 10/H.264)-1, or ITU standards/recommendations for media compression such as H.261, H.263, and H264, or the (draft) SMPTE VC-1 standard based on Microsoft Windows Media Video version 9, or other media streams compressed according to other compression methods, whether standardized or not. Furthermore, the invention is not limited to any one type of network architecture and method of encapsulation, and thus may be utilized in conjunction with one or a combination of other network architectures/protocols.

Furthermore, while the description herein is in terms of video streams, those in the art will appreciate that the invention is applicable to any multimedia streams. The detailed description herein describes aspects of checking and correcting video streams. Of course media streams further include audio streams. Therefore, in one embodiment, in addition to 709 checking for video failure conditions, also included are checking for audio and other failure conditions. For example, a simple continuity check may be made to check for the loss of audio.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

The methodologies described herein are, in one embodiment, performable by a machine that includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine-readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., one or more processors that are part of a network edge device that includes synchronizing a plurality of redundant video streams. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing or encoding a set of instructions for execution by the machine and that cause the machine to perform any one or more of the methodologies of the present invention. A carrier medium may take many forms, including but not limited to, non-volatile media, and/or volatile media.

Non-volatile media includes, for example, optical, magnetic disks, and magneto-optical disks. Volatile media includes dynamic memory, such as main memory. For example, the term "carrier medium" shall accordingly be taken to include, but not be limited to, solid-state memories, and/or optical and magnetic media.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

In the description herein, numerous specific details are set forth. However, it is understood that embodiments of the invention may be practiced without these specific details. In other instances, well-known methods, structures and techniques have not been shown in detail in order not to obscure an understanding of this description.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B that may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method in a network at a network device, the method comprising:

receiving network packets encapsulating a plurality of redundant media streams representing the same one or more media programs, each stream provided in stream packetized form as stream packets, such that each network packet encapsulates a plurality of stream packets;

buffering the received streams;

for each of the one or more media programs in each buffered stream, learning a program identifier for the media program from the buffered streams;

searching the packets of the buffered redundant streams for synchronization points for the learned program identifier, each synchronization point of each individual stream being defined by a combination of three or more pre-defined fields of the stream packets of the individual stream, at least a first pre-defined field of the three or more pre-defined fields being found in a packetized elementary stream (PES) packet header of each network packet, at least a second pre-defined field of the three or more pre-defined fields being found in a transport stream (TS) packet header of each stream packet, the pre-defined fields for any stream selected such that the combination is sufficient to uniquely identify a location in the stream;

comparing the synchronization points, and synchronizing the redundant streams based on the comparison; and providing a single stream as an output stream, the providing of each packet containing the output stream being from one of the received buffered streams, such that the output stream includes the same one or more media programs as each of the redundant media streams.

2. A method as recited in claim 1, further comprising:
ascertaining whether at least one stream failure condition from a set of possible failure conditions has occurred; and
taking corrective action based on what failure condition was ascertained to have occurred.

3. A method as recited in claim 2, further comprising:
maintaining of data sufficient to generate statistics on one or more of the stream failure conditions; and
generating statistics on the one or more types of errors.

4. A method as recited in claim 3, further comprising:
reporting the generated statistics to one or more network nodes upstream from the network device at which the network packets are received.

5. A method as recited in claim 2, further comprising:
setting the timing of the output stream.

6. A method as recited in claim 5, wherein setting the timing of the output stream packet depends on the timing of the received stream packet used to source the output stream.

7. A method as recited in claim 2, wherein the streams are multicast streams.

8. A method as recited in claim 5, further comprising:
timestamping each received packet,
wherein in the setting the timing of the output stream, consecutive packets of the output stream are provided with the same relative delay as received consecutive packets according to the timestamping.

9. A method as recited in claim 2, wherein the set of possible failure conditions includes loss of one or more network packets, receiving one or more duplicate network packets, and a failover event, including loss of a stream.

10. A method as recited in claim 2, wherein each stream packet includes a continuity counter, wherein the set of possible failure conditions includes loss of one or more network packets or receiving one or more duplicate network packets, and wherein the ascertaining includes comparing the program identifier and stream packet continuity counter for the streams.

11. A method as recited in claim 10, wherein the ascertaining further includes verifying that the next unique synchronization point is received as expected in each stream.

12. A method as recited in claim 2, wherein the set of possible failure conditions includes loss of stream or other failover event, and wherein ascertaining if there has been loss of stream or other failover event includes ascertaining whether there has been a lack of network packets being received on one of the streams for a pre-defined number of network packets.

13. A method as recited in claim 2, wherein the set of possible failure conditions includes loss of one or more network packets or receiving one or more duplicate network packets, and wherein the taking corrective action includes sourcing a missing packet for the output from one of the other streams for which the missing packet was received.

14. A method as recited in claim 2, wherein the set of possible failure conditions includes loss of stream or other failover event, and wherein the taking corrective action includes synchronously switching the output stream from the source stream in which the failover was ascertained to have occurred to another source stream.

15. A method as recited in claim 1, wherein each stream includes compressed video packetized into packetized compressed pictures, the packetized compressed pictures further packetized into the stream packets, and wherein the synchronization points are defined by a plurality of fields of the stream packets and of the compressed picture packets.

16. A method as recited in claim 15, wherein each stream further includes a compressed audio stream packetized into compressed audio packets, and wherein the synchronization points for the compressed audio stream are defined by a plurality of fields of the compressed audio packets.

17. A method as recited in claim 15, wherein each stream includes an MPEG stream according to one of the MPEG standards, the compressed picture packets are PES packets, and the stream packets are TS packets.

18. A method as recited in claim 15, wherein each stream includes a stream compressed according to one of the ITU standards/recommendations for media compression.

19. A method as recited in claim 15, wherein each stream includes a stream compressed according to the VC-1 standard for media compression.

20. A method as recited in claim 17, wherein each synchronization point is defined as the combination of the PID, payload_unit_start_indicator, continuity_counter, packet_start_code_prefix, stream_id, and PES_packet_length.

21. A method as recited in claim 15, wherein the network packets are UDP packets.

22. A method as recited in claim 1, wherein the method is carried out in a network edge device.

23. An apparatus comprising:
a set of input buffers coupled to network interfaces that are each coupled to a corresponding network and configured to receive network packets encapsulating a plurality of redundant media streams representing the same one or more media programs, each stream provided in stream packetized form as stream packets, such that each network packet encapsulates a plurality of stream packets;
redundancy logic coupled to the input buffers and configured, in operation, to learn for each of the one or more media programs in each buffer a program identifier for the media program, to search the packets of the redundant streams for synchronization points for the learned program identifier, each synchronization point of each individual stream being defined by a combination of three or more pre-defined fields of the stream packets of the individual stream, at least a first pre-defined field of the three or more pre-defined fields being found in a packetized elementary stream (PES) packet header of each network packet, at least a second pre-defined field of the three or more pre-defined fields being found in a transport stream (TS) packet header of each stream packet, the pre-defined fields for any stream selected such that the combination is sufficient to uniquely identify a location in the stream, to compare the synchronization points, to synchronize the redundant streams based on the comparison; and to provide a single stream as an output stream, the providing of each packet containing the output stream being from one of the received buffered streams, such that the output stream includes the same one or more media programs as each of the redundant media streams.

24. An apparatus as recited in claim 23, wherein the redundancy logic is further configured, in operation, to ascertain whether at least one stream failure condition from a set of possible failure conditions has occurred, and to take corrective action based on the what failure condition was ascertained to have occurred.

25. An apparatus as recited in claim 24, wherein the set of possible failure conditions includes loss of one or more network packets, receiving one or more duplicate network packets, and a failover event, including loss of a stream.

26. An apparatus as recited in claim 23, wherein each stream includes an MPEG stream, the compressed picture packets are PES packets, and the stream packets are TS packets.

27. An apparatus as recited in claim 23, wherein the network packets are UDP packets.

28. An apparatus as recited in claim 23, wherein the apparatus is in a network edge device.

29. An apparatus as recited in claim 23, comprising a processor, wherein the redundancy logic is implemented in the processor.

30. An apparatus comprising:
means for receiving network packets encapsulating a plurality of redundant media streams representing the same one or more media programs, each stream provided in stream packetized form as stream packets, such that each network packet encapsulates a plurality of stream packets;
means for buffering the received streams;
means coupled to the means for buffering for learning, for each of the one or more media programs in each stream the means for buffering, a program identifier for the media program;
means for searching the packets of the redundant streams for synchronization points for the learned program identifier, each synchronization point of each individual stream being defined by a combination of three or more pre-defined fields of the stream packets of the individual stream, at least a first pre-defined field of the three or more pre-defined fields being found in a packetized elementary stream (PES) packet header of each network packet, at least a second pre-defined field of the three or more pre-defined fields being found in a transport stream (TS) packet header of each stream packet, the pre-defined fields for any stream selected such that the combination is sufficient to uniquely identify a location in the stream;
means for comparing the synchronization points and synchronizing the redundant streams based on the comparison; and
means for providing a single stream as an output stream, wherein each packet containing the output stream is from one of the received buffered streams, such that the output stream includes the same one or more media programs as each of the redundant media streams.

31. An apparatus as recited in claim 30, further comprising:
means for ascertaining whether at least one stream failure condition from a set of possible failure conditions has occurred; and
means for taking corrective action based on what failure condition was ascertained to have occurred.

32. An apparatus as recited in claim 31, further comprising:
means for setting the timing of the output stream.

33. An apparatus as recited in claim 30, wherein each stream includes compressed video packetized into packetized compressed pictures, the packetized compressed pictures further packetized into the stream packets, and wherein the synchronization points are defined by a plurality of fields of the stream packets and of the compressed picture packets.

34. An apparatus as recited in claim 33, wherein each stream includes an MPEG stream, the compressed picture packets are PES packets, and the stream packets are TS packets.

35. An apparatus as recited in claim 33, wherein the network packets are UDP packets.

36. A computer-readable storage medium on which are encoded a set of instructions that when executed by at least one processor of a processing system, causes carrying out a method comprising:
receiving network packets encapsulating a plurality of redundant media streams representing the same one or more media-programs, each stream provided in stream packetized form as stream packets, such that each network packet encapsulates a plurality of stream packets;
buffering the received streams;
for each of the one or more media programs in each buffered stream, learning a program identifier for the media program from the buffered streams;
searching the packets of the buffered redundant streams for synchronization points for the learned program identifier, each synchronization point of each individual stream being defined by a combination of three or more pre-defined fields of the stream packets of the individual stream, at least a first pre-defined field of the three or more pre-defined fields being found in a packetized elementary stream (PES) packet header of each network packet, at least a second pre-defined field of the three or more pre-defined fields being found in a transport stream (TS) packet header of each stream packet, the pre-defined fields for any stream selected such that the combination is sufficient to uniquely identify a location in the stream;
comparing the synchronization points, and synchronizing the redundant streams based on the comparison; and
providing a single stream as an output stream, the providing of each packet containing the output stream being from one of the received buffered streams, such that the output stream includes the same one or more media programs as each of the redundant media streams.

37. A computer readable storage medium as recited in claim 36, wherein the method further comprises:
ascertaining whether at least one stream failure condition from a set of possible failure conditions has occurred; and
taking corrective action based on what failure condition was ascertained to have occurred.

38. A computer readable storage medium as recited in claim 37, wherein the method further comprises:
setting the timing of the output stream.

39. A computer readable storage medium as recited in claim 37, wherein the set of possible failure conditions includes loss of one or more network packets, receiving one or more duplicate network packets, and a failover event, including loss of a stream.

40. A computer readable storage medium as recited in claim 37, wherein each stream packet includes a continuity counter, wherein the set of possible failure conditions includes loss of one or more network packets or receiving one or more duplicate network packets, and wherein the ascertaining includes comparing the program identifier and stream packet continuity counter for the streams.

41. A computer readable storage medium as recited in claim 40, wherein the ascertaining further includes verifying that the next unique synchronization point is received as expected in each stream.

42. A computer readable storage medium as recited in claim 37, wherein the set of possible failure conditions includes loss of stream or other failover event, and wherein ascertaining if there has been loss of stream or other failover event includes ascertaining whether there has been a lack of network packets being received on one of the streams for a pre-defined number of network packets.

43. A computer readable storage medium as recited in claim 36, wherein each stream includes compressed video packetized into packetized compressed pictures, the packetized compressed pictures further packetized into the stream packets, and wherein the synchronization points are defined by a plurality of fields of the stream packets and of the compressed picture packets.

44. A computer readable storage medium as recited in claim 43, wherein each stream includes an MPEG stream, the compressed picture packets are PES packets, and the stream packets are TS packets, and wherein each synchronization point is defined as a combination of three or more of the set consisting of the program identifier (PID), payload unit start indicator, continuity counter, packet start code prefix, stream id, and PES packet length.

45. A computer readable storage medium as recited in claim 43, wherein the network packets are UDP packets.

46. A computer readable storage medium as recited in claim 36, wherein the processing system is in a network edge device.

* * * * *